Feb. 14, 1950     A. G. FORSYTH     2,497,444
COOLING MEANS FOR AIRCRAFT ENGINES
Filed Feb. 2, 1945     4 Sheets-Sheet 1

Inventor
ARCHIBALD GRAHAM FORSYTH,
By Robert B. Parson
Attorney

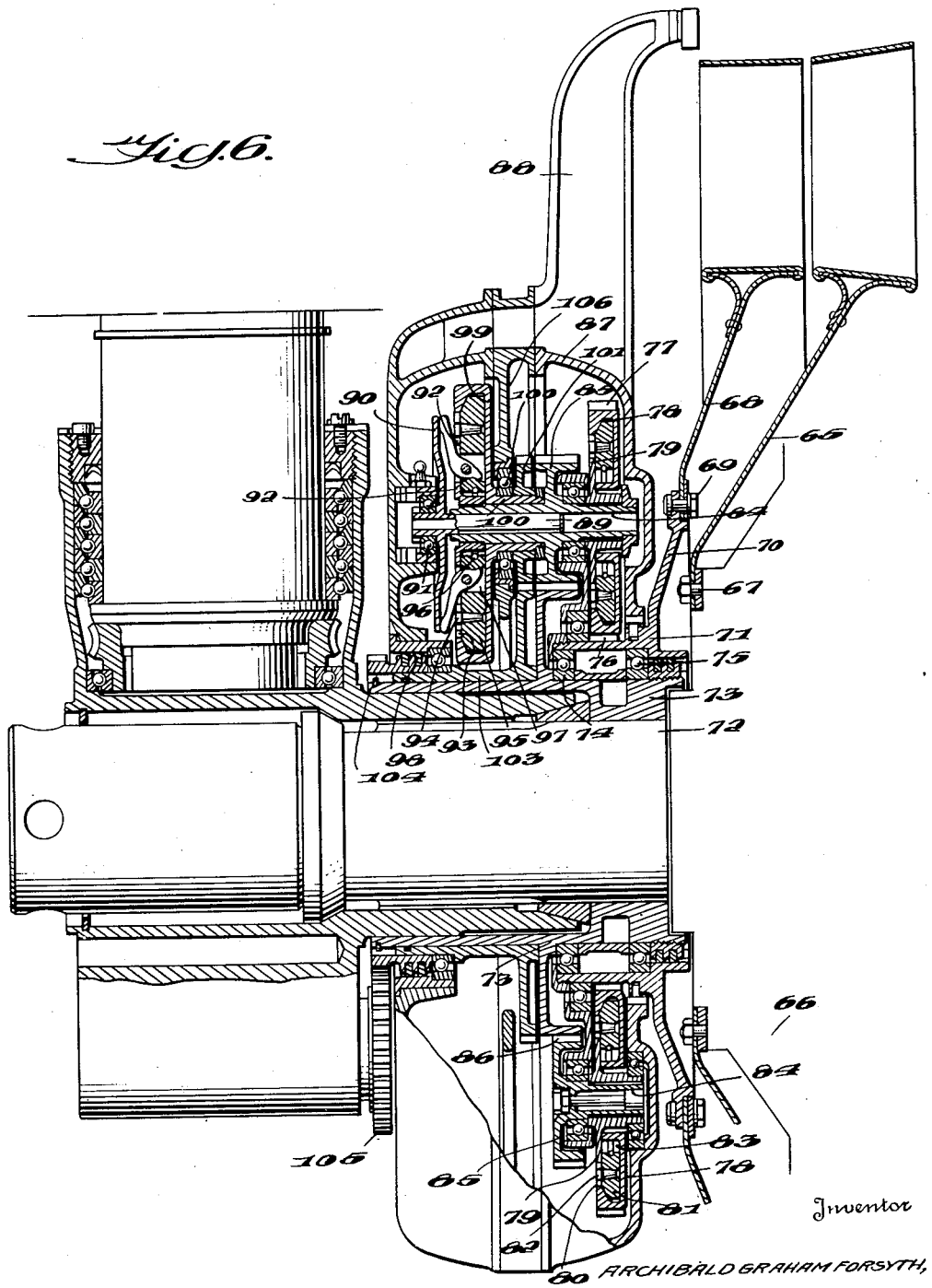

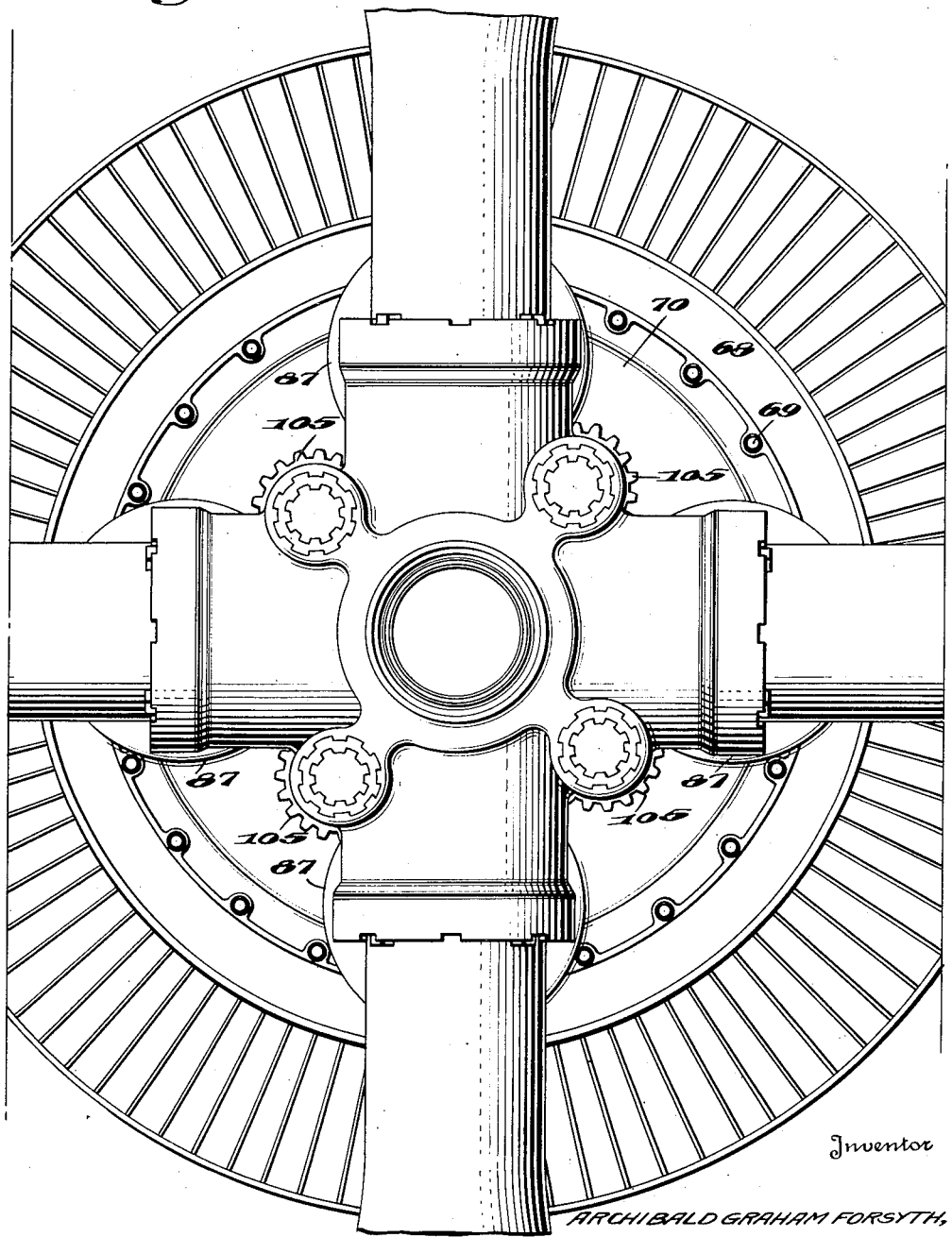

Patented Feb. 14, 1950

2,497,444

UNITED STATES PATENT OFFICE 2,497,444

COOLING MEANS FOR AIRCRAFT ENGINES

Archibald Graham Forsyth, Cheam, England, assignor to The Fairey Aviation Company Limited, Hayes, Middlesex, England Application February 2, 1945, Serial No. 575,877

3 Claims. (Cl. 170—135.743)

This invention relates to a cooling fan arrangement for aircraft engines and the like.

In some types of aircraft in which a variable pitch propeller is provided, a pitch changing mechanism is embodied in a unit disposed about the propeller drive shaft between the front facing of the aircraft engine and the propeller hub structure. Such an arrangement is the subject of several of my copending applications. Reference may be made, for example, to my copending application Serial No. 498,367, filed August 12, 1943, now abandoned.

In such systems the cooling of the aircraft engine by means of cooling fans presents a problem because of the difficulty of mounting a fan forwardly of the engine and connecting the fan to be driven from the propeller drive shaft. It is an object of the invention to provide an arrangement for so mounting and driving the rotor of a cooling fan, wherein there is no interference between the cooling fan and other parts positioned forwardly of the engine, such as the propeller and the propeller pitch changing mechanism.

Another object of the invention is the provision of means for driving the rotor of a cooling fan, the driving means being partially enclosed within the same housing as the propeller pitch changing means. This is accomplished in such a manner as to satisfy weight and space requirements.

These and other objects of the invention will become more apparent from the following description and claims when read in conjunction with the accompanying drawings, in which:

Fig. 6 is a vertical section showing another form of the invention, and

Fig. 7 is a front end view of the invention taken just forwardly of the propeller hub.

Figure 1:
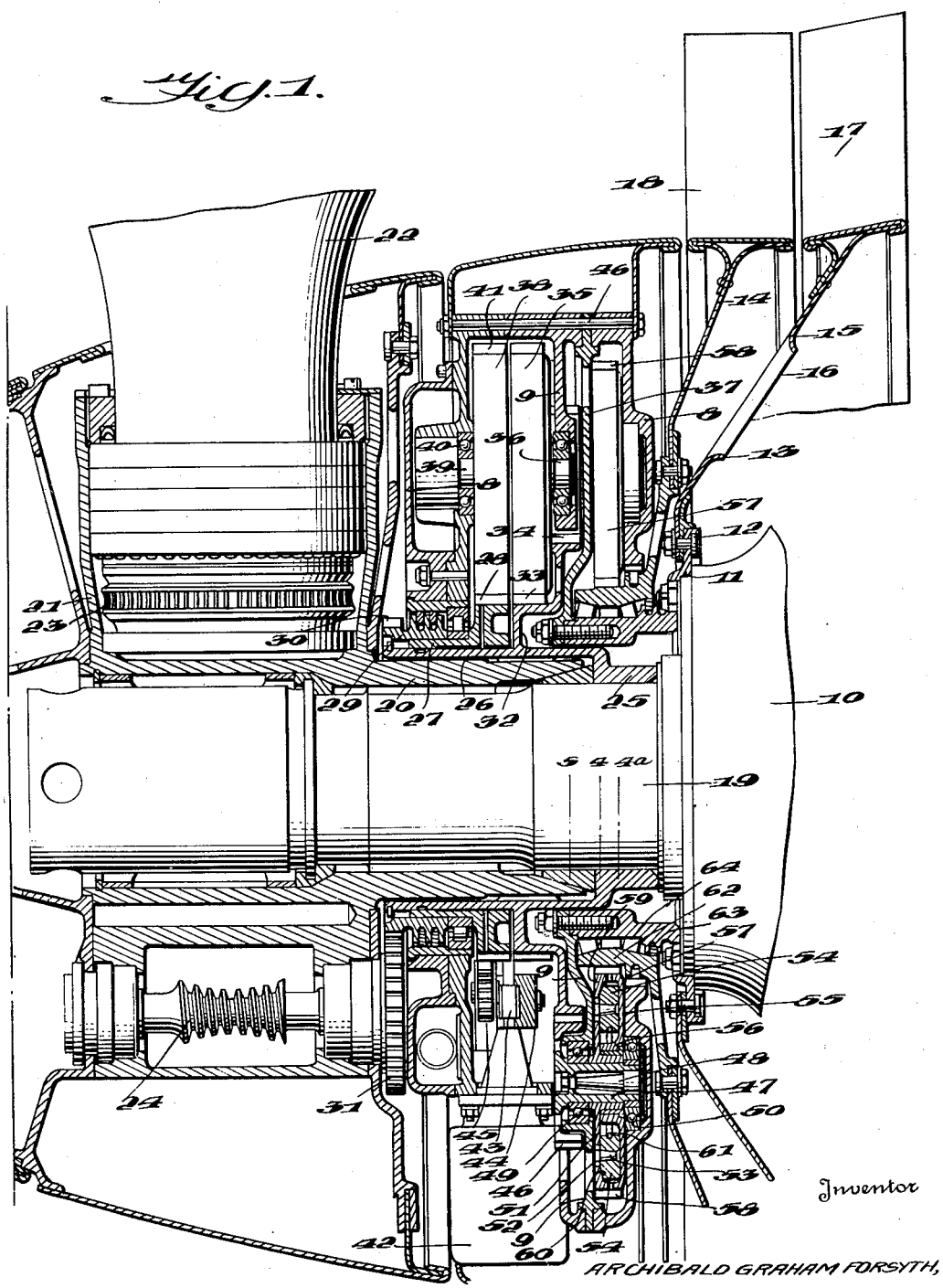
Fig. 1 is a vertical section showing one form of the invention.
Figure 3:
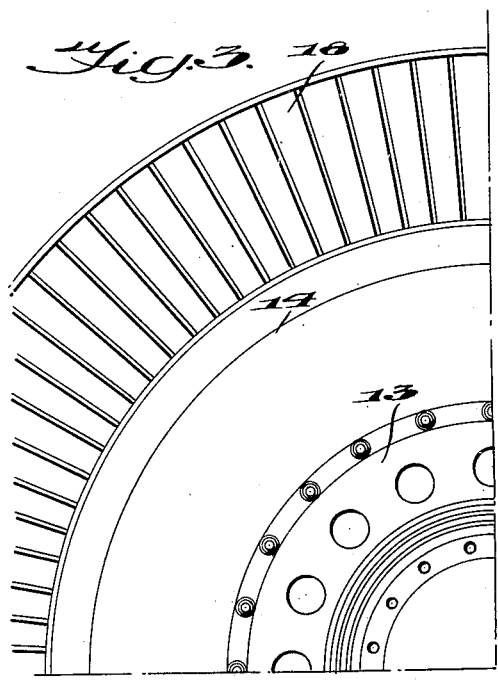
Fig. 3 is a quarter front end view of the rotor and rotor mounting.
Figure 2:
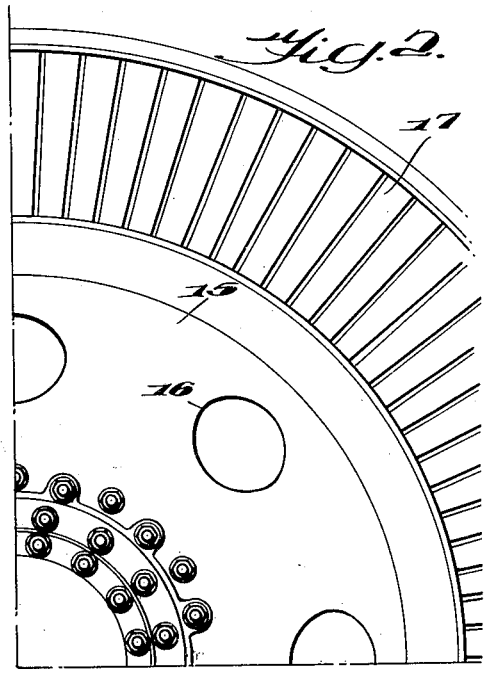
Fig. 2 is a quarter front end view of the stator and stator mounting.
Figure 5:
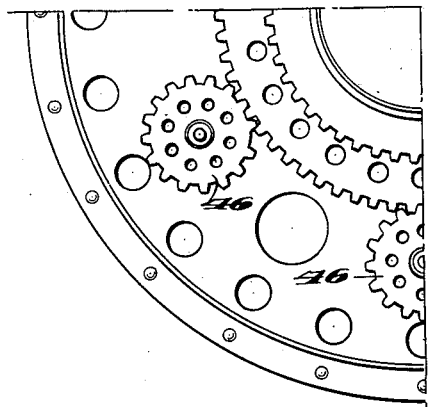
Fig. 5 is a quarter section view taken on the line 5—5 of Fig. 1.

One arrangement for carrying out the invention is illustrated in Figs. 1 to 5, inclusive. With reference to Fig. 1, the engine 10 has a front facing provided with an annular bracket 11 to which is secured by means of the bolts 12, the stator 13 of the cooling fan. The cooling fan is comprised of the stator 13 and the rotor 14.

The stator 13 is preferably constructed of sheet metal and comprises an annular rearwardly angled portion 15 provided with openings 16. At its outer end the stator 13 is provided with a series of vanes 17 as shown also in Fig. 2.

Disposed forwardly of and adjacent to the stator 13 is the rotor 14 having rotor blades or vanes 18. The manner of supporting and driving the rotor will be described hereinafter.

A propeller drive shaft 19 extends forwardly from the front facing of the engine 10. Mounted on the propeller drive shaft 19 to rotate therewith is a propeller hub sleeve 20. This sleeve 20 has propeller sockets 21 integral therewith in which are mounted the variable pitch propeller blades 22.

The roots of the propeller blades are mounted within the sockets 21 for full rotary movement about the longitudinal axis of the propeller blades and the roots of the blades are provided with a circular surrounding worm gear 23 which is adapted to be turned by worm gears 24 to vary the pitch of the blades when the worm gears 24 are rotated.

Mounted on the propeller drive shaft 19 to rotate therewith is a sleeve 25, a forwardly extending portion 26 of which surrounds the propeller hub sleeve 20. Surrounding the forwardly extending portion 26 of sleeve 25 is another sleeve 27 having a portion provided with gear teeth 28. This sleeve 27 is secured to a ring gear 29 which has gear teeth 30 which engage a gear 31 secured on the inner end of the worm gear 24.

The sleeve 25 has a radial flange 32 which is stepped in section and which is provided with two sets of gear teeth 33 and 34. The teeth 33 engage a gear wheel 35 having spindle 36 mounted in bearings 37. A similar gear wheel 38 has a spindle 39 mounted in bearings 40. This gear wheel 38 has gear teeth 41 which engage with the gear teeth 28 on the sleeve 27.

The gear wheels 35 and 38 are of the same diameter and on the same axis of rotation, but the gear wheel 35 has a greater number of teeth than that of the gear wheel 38. These gear wheels 35 and 38 are clutched together during pitch changing movement. The clutching means (not shown) may be of any suitable type, such as shown, for example, in Fig. 3 or Fig. 18 of my copending application, Serial No. 498,367, filed August 12, 1943. Since the specific clutching means for the two gear wheels 35 and 38 forms no part of the present invention, it is not illustrated in the drawings.

A pitch change in one direction is effected in the following manner.

Gear wheel 35 is constantly driven by the propeller drive shaft 19 through the sleeve 25. When it is desired to effect the pitch change, the gear wheels 35 and 38 are clutched or dogged together so that the gear wheel 38 will rotate with and at the same speed as gear wheel 35. Since, however, the gear wheel 38 has a fewer number of teeth than gear wheel 35 it will be apparent that gear wheel 38 will rotate the sleeve 27 relatively with respect to sleeve 25 and at a slower speed thus rotating the gear 30, worm 24, and effecting a pitch change.

It will be understood that the device will embody four such sets of gear wheels 35 and 38 which are capable of being clutched together. Two of these sets will be similar to that just described, and the other two will be similar but, to obtain a pitch change in the opposite direction, the teeth on gear wheels 35 will be less in number than those on gear wheel 38.

The four sets of gear wheels are used as follows: one set is used for effecting a pitch change at a low rate of speed in one direction; a second, (similar but with greater difference in the teeth number) is for effecting a pitch change in the same direction but at a greater rate of speed; a third is for effecting a pitch change in the opposite direction at a low rate of speed; and a fourth is for changing pitch in the same direction as the third, but at a higher rate of speed.

Even though the aircraft engine 10 should stop, the pitch of the propeller blades may be feathered by means of a reversible electric motor 42 the shaft of which carries a gear 43 which through gear 44 drives the pinion 45. The teeth of pinion 45 engage the teeth 28 on the sleeve 27. Rotation of the sleeve 27 and connected ring gear 29 thus rotates the gear 31, turning worm 24 and varying the pitch of the blades.

The particular manner in which the pitch of the blades may be varied is not essential to the present invention, although the manner described is admirably suited to the structural arrangement of the means for driving the rotor 14 which will now be described.

The teeth 34 on the flange 32 of sleeve 25 engage a series of six pinions 46 evenly spaced about the propeller drive shaft 19.

Each of the pinions 46 comprises the drive for one element of a slipping clutch through which the rotor 14 of the cooling fan is driven. The pinions 46 are provided with a central hollow tubular hub portion 47 and are mounted for free rotation by the spindle 48 and the two sets of bearings 49 and 50, held in place by a spider 9 secured to the bracket 11. The spider 9 is secured as a part of the housing 8 which, it will be observed, remains stationary at all times.

Figure 4:
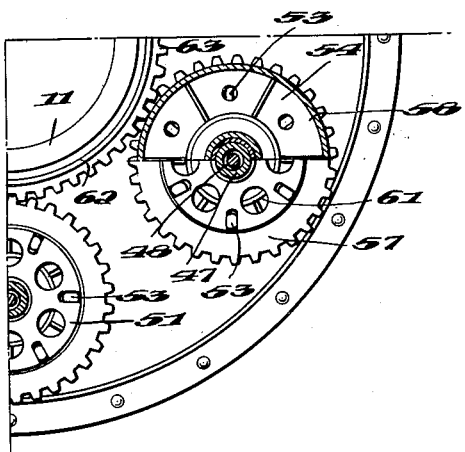
Fig. 4 is a quarter section view taken on the line 4—4 of Fig. 1 illustrating the slipping clutches, a portion of the upper one shown being taken on the line 4a—4a of Fig. 1.

Secured to the tubular hub portion 47 to rotate therewith, is a disk member 51 the periphery of which is provided with radial slots 52 (see also Fig. 4). The slots 52 slidably engage the lugs 53 which extend laterally from the centrifugal weights 54 (see Fig. 4). The weights 54 are disposed between the disk 51 and an annular ring gear member 55, the latter having a hub 56 and a peripheral portion 57 provided with gear teeth 58. This peripheral portion 57 is formed with a flange 59 which is disposed in the plane of the disk 51 and the inner surface of which is beveled as at 60 to correspond with the bevel surfaces of the weights 54. The weights 54 are held in intermediate position by the circular wire spring 61.

It should be obvious that as the disk 51 is rotated with rotation of the pinion 46, centrifugal force will move the weights 54 outwardly. As they do so, they will, because of the wedging action between the weights and the peripheral portion 57 of gear member 55, bind the disk 51 and gear member 55 so that they will rotate together.

The rotor 14 has a sleeve hub 62 provided on its outer surface with gear teeth 63 which are engaged by the teeth 58 of the ring gear member 55. Bearings 64 provide free rotation for the rotor hub 62 about the bracket 11.

It should now be clear that as sleeve 25 rotates with the propeller drive shaft 19, the gear teeth 34 carried by the radial flange 32 will cause rotation of each of the pinions 46 of the six slipping clutches and consequently of the disk 51 of each slipping clutch. Centrifugal force keeps the weights 54 outwardly and effects a driving clutch connection between the disk 51 and rear gear member 55 of each slipping clutch. Since the teeth on ring gear member 55 engage the teeth on rotor hub 62, the rotor 14 of the cooling fan will be rotated.

In Figs. 6 and 7 another embodiment of the invention is illustrated. As in the first embodiment, the stator 65 is secured to the front facing of the engine 66 by bolts 67. The rotor 68 is secured by the bolts 69 to the annular flange 70 of the tubular gear member 71. Mounted on the propeller drive shaft 72 so as to rotate therewith is a sleeve 73. The tubular gear member 71 concentrically surrounds but is spaced from the sleeve 73 and it is mounted for relative rotation with respect to the sleeve 73 by the bearings 74 and 75.

The tubular gear member 71 carries teeth 76 on its outer surface, which teeth engage teeth 77 on one element 78 of each of four slipping clutches. The slipping clutches are similar to those described in connection with the first embodiment. They each include, aside from the element 78, a disk 79 with slots 80, the weights 81 with their lugs 82, the spring 83. The hub portion of the disk 79 is keyed to rotate with the hollow tubular member 84 which has an integral pinion gear 85, the teeth of which engage the teeth 86 of the sleeve gear 73.

It will be apparent that rotation of sleeve gear 73 by the propeller drive shaft 72 will rotate each of the pinions 85 and thus rotation of the disks 79 of the slipping clutches. The centrifugal force of the weights 81 will cause the element 78 of each clutch to rotate with its disk 79 thus driving the rotor 68 of the cooling fan.

The slipping clutches are disposed within a stationary housing 87. The housing 87 has a hollow anchorage portion 88 which secures the housing against rotation. The housing 87 encloses the pitch changing mechanism which will now be described.

Some of the clutches for driving the rotor are connected with the pitch changing mechanism. Viewing the upper portion of Fig. 6 it will be noted that, mounted within the hollow tubular member 84 for limited axial movement is the cylindrical rod 89. The cylindrical rod 89 carries the disk 90 and the rod and disk as a unit are mounted for rotary movement with respect to the hollow tubular member 84, the forward end of the cylindrical rod 89 being supported by the bearings 91.

Keyed to the hollow tubular member 84 is a disk 92. This disk 92 has slots 93 in which are engaged the lugs 94 of the weights 95 in a manner similar to that described in connection with the slipping clutches described above. The weights 95, as before, are supported by a spring 96, but unlike the slipping clutches heretofore described, the weights 95 have cut outs 97 in which are disposed the pivoted arms 98. The outer ends of the pivoted arms 98 engage the disk 90, the purpose of which will be described later.

The weights 95 when in their outer position, operatively connect the disk 92 and the clutch element 99. The clutch element 99 has a hub sleeve 100 which surrounds the hollow tubular member 84 and is mounted for free rotary movement with respect thereto. The hub sleeve 100 of the clutch element 99 has a gear wheel 101 keyed to rotate therewith. The gear wheel 101 is the same diameter as the gear wheel 85, but has a lesser number of teeth. This gear wheel 101 in turn engages teeth on the flange 102 of the sleeve 103. At its forward end the sleeve 103 carries a ring gear 104, the teeth of which engage the gear wheels 105 of the pitch changing means in the propeller hub structure, in a manner similar to that described in connection with the first embodiment. It will be noted that housing 87 includes a web 106 provided with an opening in which the bearings 107, for supporting the sleeve hub 100, are disposed.

The operation is as follows:

Since the hollow tubular member 84 rotates with the propeller drive shaft 72 the disk 92 of the clutch, which is keyed to the former, will also rotate. Centrifugal force will cause the weights 95 to move to their outermost position, thus binding, or operatively connecting the disk 92 and the clutch element 99 to effect rotation of the latter. The gear wheel 101 keyed to the hub sleeve 100 will then rotate at the same speed as gear wheel 85. Since, however, it has fewer teeth than the gear wheel 101, relative movement will be effected between sleeves 73 and 103. Sleeve 103, being connected to the ring gear 104, will rotate the latter. As previously explained, this latter gear 104 rotates the gears 105 and effects a change in pitch of the propeller blades.

When the pitch changing movement required has been effected, the disk 90 is moved to the right in Fig. 6, thus forcing the pivot arms 98 inwardly and forcing the weights 95 radially inwards. This effects a de-clutching of the disk 92 and clutch element 99 so that gear wheel 101 will be freely mounted and no pitch changing movement will take place. The disk 90 may be moved by any suitable means such as by electro-magnets or the like (not shown). The electric wiring for the electro-magnets may be enclosed in the anchorage 88. The electro-magnets, or such similar means for moving the disk 90, form no part of the present invention but, if desired, reference may be made to my copending application Serial No. 498,367, filed August 12, 1943, mentioned above.

It will be understood that several of such clutches may be provided (four being shown in Fig. 7). These will be for effecting pitch changes to various pitch positions and at different speeds as referred to in connection with the embodiment of Figs. 1 to 5, inclusive. It will be understood that pitch movement in the opposite direction to that described is effected by changing the relative number of teeth on gear wheels 85 and 101. In this embodiment a reversible electric motor may also be provided for feathering as in the embodiment of Figs. 1 to 5, inclusive. In accordance with the practice described in said copending application, suitable limit means may be provided for stopping the pitch change when the predetermined change has been effected.

It is apparent from the above description of the invention and its operation that by positioning the stator and rotor rearwardly of the front facing of the engine, interference between the cooling fan and the propeller or the propeller pitch changing unit is prevented, and in addition, the cooling fan is positioned closer to the engine surfaces which it is intended to cool.

Some changes in structure and arrangement may be made without departing from the invention which should not be limited except as indicated by the following claims.

I claim:

1. In a fan, a support having a facing, a rotatable driving element extending from said facing, a bracket mounted on said facing and having a bearing portion surrounding said driving element, a bladed stator carried by said bracket, a bladed rotor rotatably mounted on said bearing portion, and a power transmitting element connecting said driving element and said rotor, said stator and said rotor being disposed on one side of the plane of said facing, and said bearing portion being disposed on the other side of said plane.

2. A variable pitch propeller and fan arrangement comprising a propeller, a propeller shaft, propeller pitch changing mechanism surrounding said shaft, a driving element for said mechanism rotating with said shaft, a fixed bracket surrounding said shaft, a fan stator carried by said bracket, a fan rotor supported by said bracket, and a connection for driving said rotor from said driving element for the pitch changing mechanism.

3. An arrangement as set forth in claim 2, said driving element consisting of a sleeve rotating with the propeller and having two sets of gear teeth integral with the sleeve, one set of said teeth cooperating with said pitch changing mechanism to drive said mechanism, the other set of gear teeth serving to drive the fan rotor.

ARCHIBALD GRAHAM FORSYTH.

REFERENCES CITED

The following references are of record in the file of this patent:

UNITED STATES PATENTS

| Number | Name | Date |
| --- | --- | --- |
| 130,113 | DuPont, Jr. | Aug. 6, 1872 |
| 910,760 | Wood | Jan. 26, 1909 |
| 1,990,979 | Chilton | Feb. 12, 1935 |
| 2,145,131 | Rhines | Jan. 24, 1939 |
| 2,173,896 | Caldwell | Sept. 26, 1939 |
| 2,174,418 | Hersey | Sept. 26, 1939 |
| 2,274,743 | Rosskopf | Mar. 3, 1942 |
| 2,347,153 | Hagen et al. | Apr. 18, 1944 |
| 2,371,872 | Caldwell et al. | Mar. 20, 1945 |
| 2,426,635 | Mercier | Sept. 2, 1947 |
| 2,430,225 | Hagler | Nov. 4, 1947 |
| 2,435,138 | Heppner | Jan. 27, 1948 |
| 2,436,087 | Benson | Feb. 17, 1948 |
| 2,446,663 | Palmatier | Aug. 10, 1948 |

FOREIGN PATENTS

| Number | Country | Date |
| --- | --- | --- |
| 560,065 | Great Britain | Mar. 17, 1944 |